(12) United States Patent  
Duan et al.

(10) Patent No.: US 12,298,020 B2
(45) Date of Patent: May 13, 2025

(54) AIR-CONDITIONING INSTRUCTION DETECTION METHOD, CONTROL DEVICE AND AIR-CONDITIONING SYSTEM (71) Applicants: GD MIDEA AIR-CONDITIONING EQUIPMENT CO., LTD., Guangdong (CN); MIDEA GROUP CO., LTD., Guangdong (CN)

(72) Inventors: Xiaohua Duan, Guangdong (CN); Weirui Zheng, Guangdong (CN); Wenchao Liang, Guangdong (CN); Zhibin Chen, Guangdong (CN)

(73) Assignees: GD MIDEA AIR-CONDITIONING EQUIPMENT CO., LTD., Guangdong (CN); MIDEA GROUP CO., LTD., Guangdong (CN)

( * ) Notice: Subject to any disclaimer, the term of this patent is extended or adjusted under 35 U.S.C. 154(b) by 431 days.

(21) Appl. No.: 17/674,122

(22) Filed: Feb. 17, 2022

(65) Prior Publication Data

US 2022/0170656 A1 Jun. 2, 2022

Related U.S. Application Data (63) Continuation of application No. PCT/CN2019/113203, filed on Oct. 25, 2019.

(30) Foreign Application Priority Data

Aug. 20, 2019 (CN) .......................... 201910769173.2

(51) Int. Cl.
*F24F 11/50* (2018.01)
*G05B 19/042* (2006.01)
(Continued)

(52) U.S. Cl.
CPC ............ *F24F 11/50* (2018.01); *G05B 19/042* (2013.01); *F24F 2120/12* (2018.01);
(Continued)

(58) Field of Classification Search
CPC ........ F24F 11/50; F24F 2120/12; F24F 11/46; F24F 2120/14; G05B 19/042;
(Continued)

(56) References Cited

U.S. PATENT DOCUMENTS 9,825,773 B2 * 11/2017 Okubo ..................... G10L 15/24
2015/0354846 A1    12/2015 Hales et al.
2016/0378424 A1 * 12/2016 Kanda ..................... G06F 3/013
                                                                      700/275

FOREIGN PATENT DOCUMENTS

CN      201582942 U      9/2010
CN      102967026 A      3/2013
(Continued)

OTHER PUBLICATIONS

International Search Report and Written Opinion dated Mar. 26, 2020 received in International Application No. PCT/CN2019/113203 together with an English language translation.
(Continued)

*Primary Examiner* — Crystal J Barnes-Bullock
(74) *Attorney, Agent, or Firm* — Scully, Scott, Murphy & Presser, P.C.

(57) ABSTRACT

A method for detecting air-conditioning instructions, a control device and an air-conditioning system are provided. According to the method, first position information of a preset user relative to an indoor unit is acquired, second position information of the preset user relative to a line control device of the indoor unit according to the first position information is determined, and detection parameters of a voice module in the line control device according (Continued)

to the second position information is determined. The control device has a memory and a processor. The memory stores an air-conditioning instruction detection program. The program is executable by the processor to implement the method. The air-conditioning system has the control device.

20 Claims, 5 Drawing Sheets

(51) Int. Cl.
  *F24F 120/12* (2018.01)
  *F24F 120/14* (2018.01)
(52) U.S. Cl.
  CPC .............................. *F24F 2120/14* (2018.01);
    *G05B 2219/23386* (2013.01); *G05B 2219/2614* (2013.01)
(58) Field of Classification Search
  CPC ............ G05B 2219/2614; G05B 15/02; G05B 2219/23386
  USPC ......................................................... 700/276
  See application file for complete search history.

(56) References Cited

FOREIGN PATENT DOCUMENTS

| | | | | | |
|---|---|---|---|---|---|
| CN | 203432032 | U | | 2/2014 | |
| CN | 204116902 | U | | 1/2015 | |
| CN | 104848478 | A | * | 8/2015 | ............ F24F 11/001 |
| CN | 106257355 | A | * | 12/2016 | ............ G05B 15/02 |
| CN | 106440192 | A | | 2/2017 | |
| CN | 106448658 | A | * | 2/2017 | ............ G10L 15/02 |
| CN | 107152768 | A | | 9/2017 | |
| CN | 107449111 | A | * | 12/2017 | |
| CN | 108592349 | A | | 9/2018 | |
| CN | 108831474 | A | | 11/2018 | |
| CN | 109188927 | A | * | 1/2019 | ............ G05B 15/02 |
| CN | 109210703 | A | | 1/2019 | |
| CN | 109599106 | A | * | 4/2019 | |
| CN | 110085235 | A | * | 8/2019 | ............ G10L 15/26 |
| CN | 110176233 | A | * | 8/2019 | |
| CN | 110186171 | A | | 8/2019 | |
| CN | 110486859 | A | * | 11/2019 | |
| CN | 110925944 | A | * | 3/2020 | |
| CN | 111981644 | A | * | 11/2020 | ............ F24F 11/526 |
| CN | 112053680 | A | * | 12/2020 | |
| CN | 112413834 | A | * | 2/2021 | ............. F24F 11/50 |
| CN | 112413835 | A | * | 2/2021 | ............. F24F 11/64 |
| CN | 114543306 | A | * | 5/2022 | |
| CN | 116246619 | A | * | 6/2023 | |
| CN | 113050437 | B | * | 7/2023 | ............ G05B 15/02 |
| EP | 2087293 | A1 | | 8/2009 | |
| JP | 2000-241002 | A | | 9/2000 | |
| JP | 2007078270 | A | * | 3/2007 | |
| KR | 10-2013-0032196 | A | | 4/2013 | |
| WO | 2019013349 | A1 | | 1/2019 | |
| WO | WO-2019013316 | A1 | * | 1/2019 | ............. F24F 11/46 |
| WO | WO-2019034083 | A1 | * | 2/2019 | ......... G05B 19/4185 |
| WO | WO-2020145478 | A1 | * | 7/2020 | |
| WO | WO-2021031334 | A1 | * | 2/2021 | ............. F24F 11/64 |
| WO | WO-2021031335 | A1 | * | 2/2021 | ............. F24F 11/50 |
| WO | WO-2022247245 | A1 | * | 12/2022 | |

OTHER PUBLICATIONS

First Office Action dated Sep. 2, 2021 received in Chinese Patent Application No. CN 201910769173.2 together with an English language translation.

Notification to Grant Patent Right for Invention dated Nov. 17, 2021 received in Chinese Patent Application No. CN 201910769173.2 together with an English language translation.

Supplementary European Search Report dated Oct. 5, 2022 received in European Patent Application No. EP 19942407.8.

* cited by examiner

AIR-CONDITIONING INSTRUCTION DETECTION METHOD, CONTROL DEVICE AND AIR-CONDITIONING SYSTEM

CROSS-REFERENCE TO RELATED APPLICATIONS

The present application is a continuation application of PCT International Application No. PCT/CN2019/113203, filed on Oct. 25, 2019, which claims the priority to and benefits of Chinese patent application No. 201910769173.2, filed on Aug. 20, 2019 and titled "Air Conditioning System, Air Conditioning Instruction Detection Method, Control Device And Readable Storage Medium", the entire contents of which are incorporated in this application by reference for all purposes. No new matter has been introduced.

TECHNICAL FIELD

The present application relates to the field of air conditioning, and in particular, to an air-conditioning instruction detection method, a control device and an air-conditioning system.

BACKGROUND

In order to facilitate indoor users to control the air conditioner, especially the multi-connected air-conditioning system, line controllers are installed indoors to control the operation of the indoor units. Furthermore, with the improvement of intelligent degree of air-conditioning systems, most air-conditioning systems have voice control function.

At present, most of voice modules for implementing voice control function are located in the indoor units, the indoor units are generally installed at high positions, and the voice modules are far away from the users. Moreover, the detection of voice control instructions by the voice modules does not consider the influence of the change of the users' positions indoors, which leads to the low recognition rate of voice control instructions and failure of the indoor units to respond to the users' instructions effectively.

The above content is only set to assist in understanding the technical solution of the present application, and it does not mean that the above content is recognized as the prior art.

SUMMARY

The main purpose of the present application is to provide an air-conditioning instruction detection method, aiming at, at least, improving the accuracy of an air conditioner recognizing voice instructions, thereby achieving that the air conditioner is capable of responding to the voice instructions timely and effectively.

In order to achieve the above purpose, the application provides an air-conditioning instruction detection method, which includes:

acquiring first position information of a preset user relative to an indoor unit;

determining second position information of the preset user relative to a line control device of the indoor unit according to the first position information;

determining detection parameters of a voice module in the line control device according to the second position information; and controlling the voice module to detect voice control instructions according to the detection parameters.

Optionally, before the determining second position information according to the first position information, the method further comprises:

acquiring third position information of the line control device relative to the indoor unit;

establishing a preset correspondence relationship between the first position information and the second position information according to the third position information; and determining the second position information according to the first position information comprises:

inputting the first position information to the preset correspondence relationship to determine the second position information.

Optionally, the inputting the first position information to the preset correspondence relationship to determine the second position information comprises:

representing the first position information as first distances of the preset user relative to the indoor unit in a plurality of first preset directions; and converting the first distances to second distances relative to the line control device in a plurality of second preset directions based on the preset correspondence relationship, and taking the second distances as the second position information.

Optionally, when the preset correspondence relationship is a calculation relationship, the inputting the first position information to the preset correspondence relationship to determine the second position information includes inputting the first position information into a preset formula to obtain a calculation result and taking the calculation result as the second position information.

Optionally, the acquiring first position information of a preset user relative to an indoor unit comprises:

acquiring infrared detection information of the preset user detected by an infrared sensor arranged in the indoor unit; and determining the first position information according to the infrared detection information.

Optionally, the infrared detection information includes a time difference between the infrared sensor emitting infrared rays in a plurality of directions and receiving infrared rays reflected by the preset user, and the determining the first position information according to the infrared detection information includes:

determining the first position information according to the time difference.

Optionally, the infrared detection information includes a time difference between the infrared sensor emitting infrared rays in a plurality of directions and receiving infrared rays reflected by the preset user and heat distribution information in a space where the indoor unit is located, the determining the first position information according to the infrared detection information comprises:

determining a position of a feature part of the preset user according to recognition result of recognizing human bodies in the heat distribution information;

acquiring a time difference corresponding to the position of the feature part; and determining a direction and/or a distance of the feature part relative to the indoor unit according to the acquired time difference as the first position information.

Optionally, the determining the first position information according to the infrared detection information comprises:

determining a position of a mouth of the preset user according to the infrared detection information; and acquiring position information of the mouth's position as the first position information.

Optionally, the determining detection parameters of a voice module in the line control device according to the second position information comprises:

determining pickup characteristic parameters and voice recognition parameters according to the second position information;

the controlling the voice module to detect voice control instructions according to the detection parameters comprises:

controlling the voice module to form a sound pickup beam according to the pickup characteristic parameters;

extracting a voice signal from the sound pickup beam according to the voice recognition parameters; and extracting a voice control instruction from the voice signal.

Optionally, the extracting a voice control instruction from the voice signal further comprises:

determining a signal strength threshold according to the second position information;

extracting a strength characteristic parameter of the voice signal;

executing the extracting a voice control instruction from the voice signal in a determination that the strength characteristic parameter is greater than or equal to the signal strength threshold; and sending a prompt message in a determination that the strength characteristic parameter is less than the signal strength threshold.

Optionally, the closer the preset user is relative to the line control device, and/or the closer the preset user is directly in front of the line control device according to the second position information, the greater the signal strength threshold is.

Optionally, before the obtaining first position information of a preset user relative to an indoor unit, the method further comprises:

determining that there are more than one persons in a space where the indoor unit is located, and obtaining a duration of each person staying in the space; taking a user with a shortest duration as the preset user; or determining that there is only one person in a space where the indoor unit is located, taking the person as the preset user.

Optionally, the acquiring first position information of a preset user relative to an indoor unit comprises:

acquiring the first position information with a position detection device provided in the indoor unit.

Optionally, the determining second position information according to the first position information comprises:

determining direction information and/or distance information of the preset user relative to the line control device according to the first position information, and taking at least one of the direction information and the distance information as the second position information. The second position information can be only the direction information. The second position information can be only the distance information. The second position information can be the combination of the direction information and the distance information.

Optionally, the determining detection parameters of a voice module in the line control device according to the second position information comprises:

determining a pickup characteristic parameter is determined according to the at least one of the direction information and the distance information.

Optionally, the determining a pickup characteristic parameter according to the at least one of the direction information and the distance information comprises:

determining a pointing direction, an amplitude, or a phase of the sound pickup beam according to the at least one of the direction information and the distance information, and taking the pointing direction, the amplitude, or the phase of the sound pickup beam as the pickup characteristic parameter.

Optionally, the determining detection parameters of a voice module in the line control device according to the second position information comprises:

determining a voice recognition parameter according to the distance information.

Optionally, the determining a voice recognition parameter according to the distance information comprises:

determining a noise reduction coefficient for voice signal processing according to the distance information, and taking the noise reduction coefficient as the voice recognition parameter.

In order to achieve the above purpose, the present application also provides a control device, which comprises a memory, a processor, and an air-conditioning instruction detection program stored in the memory and executable the processor, when the air-conditioning instruction detection program is executed by the processor, operations of an air-conditioning instruction detection method as follows are realized:

acquiring first position information of a preset user relative to an indoor unit;

determining second position information of the preset user relative to a line control device of the indoor unit according to the first position information;

determining detection parameters of a voice module in the line control device according to the second position information; and controlling the voice module to detect voice control instructions according to the detection parameters.

In order to achieve the above purpose, the present application also provides an air-conditioning system, which comprises:

a plurality of indoor units distributed in different spaces, wherein each of the plurality of indoor units is provided with an infrared sensor configured to detect infrared detection information of a space where the indoor unit is located;

a plurality of line control devices arranged in one-to-one correspondence with the plurality of indoor units, wherein an indoor unit and a corresponding line control device are located in a same space, each of the plurality of line control devices comprises a voice module and a controller, the voice module is configured to detect a voice control instruction, the controller is communicated with a corresponding indoor unit and configured to obtain parameters set by a user and control the operation of the corresponding indoor unit according to the parameters set by the user; and a control device communicating with the plurality of indoor units and voice modules, the control device comprising a memory, a processor and an air-conditioning instruction detection program stored in the memory and executable by the processor, wherein when the air-conditioning instruction detection program is executed by the processor, operations of an air-conditioning instruction detection method as follows are realized:

acquiring first position information of a preset user relative to an indoor unit;

determining second position information of the preset user relative to a line control device of the indoor unit according to the first position information;

determining detection parameters of a voice module in the line control device according to the second position information; and controlling the voice module to detect voice control instructions according to the detection parameters.

The present application provides an air-conditioning instruction detection method. According to the method, the second position information of the preset user relative to the line control device is determined according to the first position information of the preset user relative to the indoor unit, the detection parameters of the voice module in the line control device are determined according to the second position information, and the voice module is controlled to detect the voice control instruction according to the detection parameters. As the installation position of the line control device is closer to the preset user, the voice signals detected by the voice module in the line control device are stronger than the voice signals detected by the indoor unit. Furthermore, the detection parameters of the voice module are different when the second position information is different. Thus, regardless of where the preset user sends out the voice control instruction, it can be accurately recognized by the voice module, thereby improving the accuracy of the air conditioner recognizing voice instruction. As a result, the air conditioner can respond to the voice instruction sent by users in time and effectively.

The realization of the purposes, functional features and advantages of the present application will be further explained with reference to the accompanying drawings in combination with the embodiments.

DETAILED DESCRIPTION OF EMBODIMENTS

It should be understood that the exemplary embodiments described herein are intended to be explanatory only and are not intended to limit the present application.

A main solution of embodiments of the present application is: acquiring first position information of a preset user relative to an indoor unit; determining second position information of the preset user relative to a line control device of the indoor unit according to the first position information; determining detection parameters of a voice module in the line control device according to the second position information; and controlling the voice module to detect voice control instruction according to the detection parameters.

For most of the voice modules for realizing voice control function are located in indoor units, and the indoor units are generally installed at a high position, the voice modules are far away from the users. Moreover, the detection of voice control instructions by the voice modules does not consider the influence of changes of the users' positions indoors, which leads to a low recognition rate of voice control instructions and failure of the indoor units to respond to the users' instructions effectively and timely.

The present application provides the above solution, aiming at improving the accuracy of air conditioners recognizing voice instructions, so that the air conditioners can respond to the voice instructions in time and effectively.

The present application provides an air-conditioning system, which can be a single air-conditioning system or a multi-connected air-conditioning system. A multi-connected air conditioner can be set in relatively small areas, such as, household.

Figure 1:
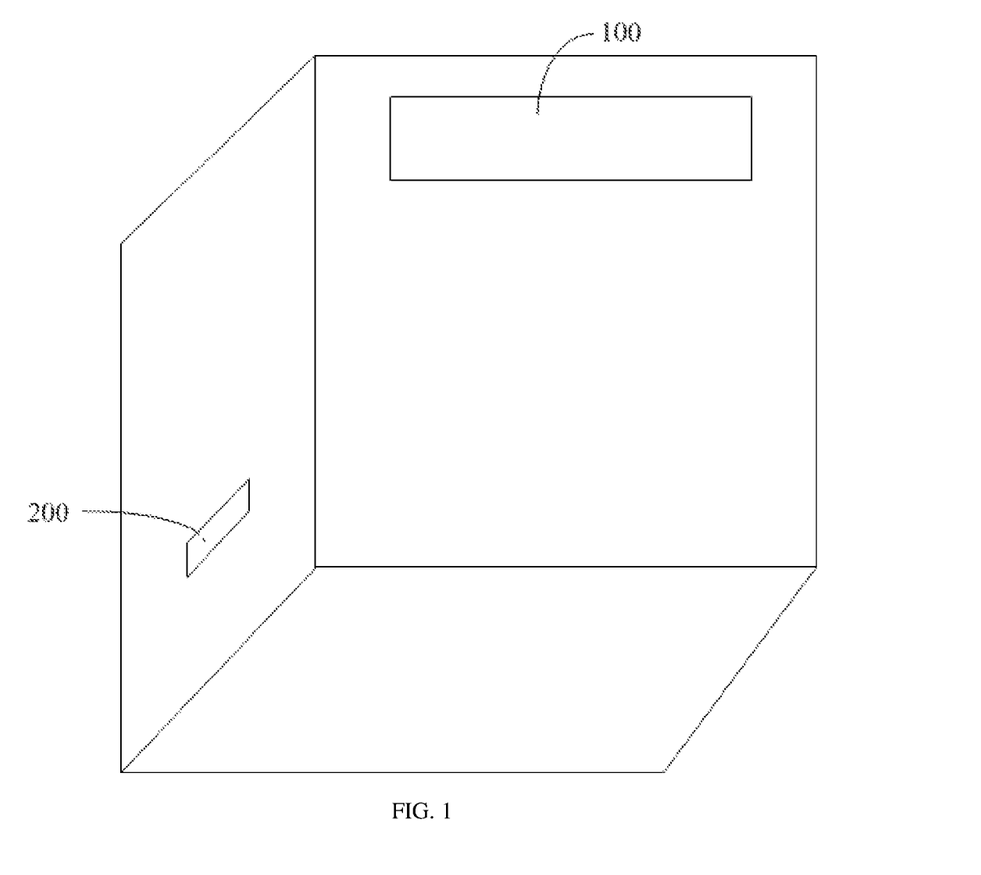
FIG. 1 is a schematic diagram showing installation positions of an indoor unit and a line control device of an air-conditioning system in a space according to an embodiment of the present application.
Figure 2:
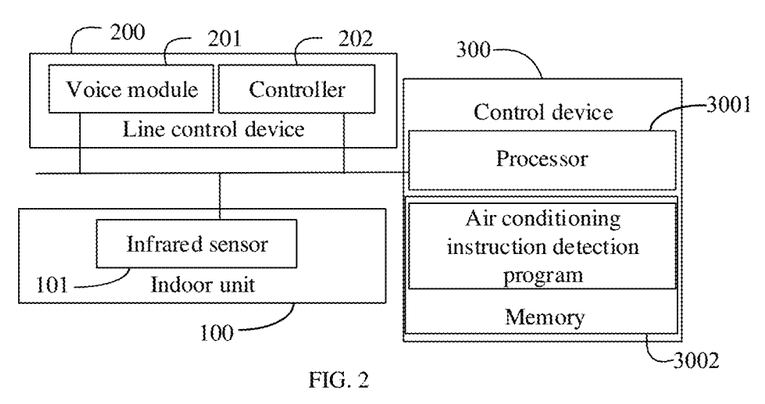
FIG. 2 is a structural diagram of hardware according to an embodiment of the air-conditioning system of the present application.

Referring to FIGS. 1 and 2, the air-conditioning system includes a plurality of indoor units 100, a plurality of line control devices 200 and the like. The indoor units 100 are distributed in different spaces, and each indoor unit 100 is provided with an infrared sensor 101, which is configured to detect infrared detection information of a space where the indoor unit 100 is located. The line control devices 200 are arranged in one-to-one correspondence with the indoor units 100. An indoor unit 100 and its corresponding line control device 200 are located in the same space. The line control device 200 includes a voice module 201 and a controller 202. The voice module 201 is configured to detect voice control instructions. The controller 202 can communicate with the corresponding indoor unit 100. The controller 202 is configured to obtain parameters set by users and control the operation of the corresponding indoor unit 100 according to the parameters set by the users.

When there is more than one indoor unit 100, each of a plurality of spaces can be installed with one indoor unit 100 and its corresponding line control device 200. As shown in FIG. 1, the indoor unit 100 and its corresponding line control device 200 are separated from each other and fixedly installed in the same space, and can be installed at different heights of different walls of the space. For example, the indoor unit 100 is installed at a height of 2 m of a first wall, and the line control device 200 is installed at a height of 1.2 m of a second wall connected with the first wall.

The users can control the operation of the indoor unit 100 by manipulating the line control device 200. For example, the controller 202 of the line control device 200 can acquire parameters set by a user (temperature, turn-on or turn-off, wind speed, etc.) based on the user's operation, and issue control instructions to the indoor unit 100 according to the parameters set by the user to control the operation of the indoor unit 100. In addition, the user can also control the operation of the indoor unit 100 by issuing a voice control instruction. For example, the voice module 201 of the line control device 200 receives voice signals in the space in which the line control device 200 is located, recognizes the voice control instruction in the voice signals, and transmits the voice control instruction to the indoor unit 100 to control the operation of the indoor unit 100.

In addition, certain embodiments of the present application also provide a control device 300, and the air-conditioning system can also include the control device 300. The control device 300 can be built in the line control device 200 or be built in the indoor unit 100, or the control device 300 can be separated from the line control device 200 and the indoor unit 100. Referring to FIG. 2, the control device 300 includes a processor 3001 such as a CPU, a memory 3002 and the like. The memory 3002 can be a high speed RAM memory, or a stable memory (Non-volatile memory), such as a disk storage. The memory 3002 can optionally be independent of the aforementioned processor 3001.

The processor 3001 is communicated with the memory 3002, the voice module 201 of the line control device 200 and the infrared sensor 101 of the indoor unit. The processor 3001 can obtain desired data from the memory 3002 and the voice module 201.

As will be understood by those skilled in the art, the configuration of the device shown in FIG. 2 does not limit the device and the device can include more or fewer components than illustrated, or a combination of certain components, or a different arrangement of components.

As shown in FIG. 2 the memory 3002, as a readable storage medium, can store an air-conditioning instruction detection program. In the device shown in FIG. 2, the processor 3001 can be set to call the air-conditioning instruction detection program stored in the memory 3002, and execute operations of the air-conditioning instruction detection method in the following embodiments.

The present application also provides an air-conditioning instruction detection method.

Figure 3:
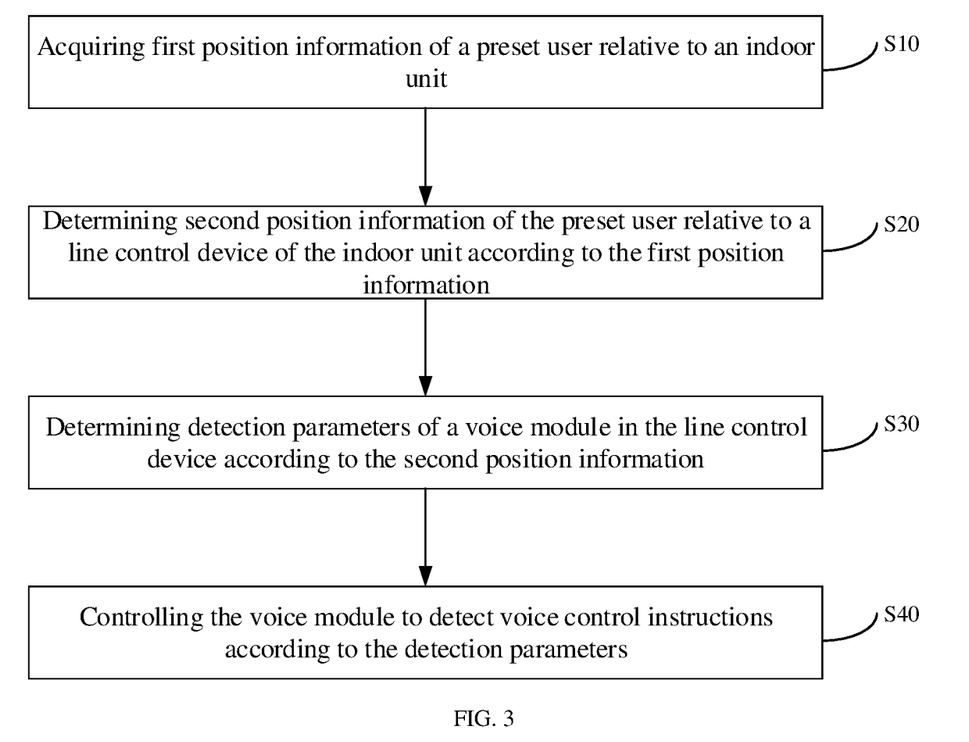
FIG. 3 is a flow diagram of a first embodiment of an air-conditioning instruction detection method of the present application.

Referring to FIG. 3, a first embodiment of the air-conditioning instruction detection method of the present application is provided. The air-conditioning instruction detection method includes the following operations.

Step S10, acquiring first position information of a preset user relative to an indoor unit.

The first position information can be detected by a position detection device in the space where the indoor unit is located, and the position detection device can include a camera, an infrared sensor or the like. The position detection device can be arranged independently of the indoor unit or built in the indoor unit. Optionally, the first position information can be detected by a position detection device provided in the indoor unit.

Step S20, determining second position information of the preset user relative to a line control device of the indoor unit according to the first position information.

The second position information includes a direction and/or a distance of the preset user relative to the line control device, a direction and/or a distance of an area of the preset user relative to the line control device, or the like. For example, since the position of the line control device relative to the indoor unit is fixed and the second position information changes with the change of the first position information, a preset correspondence relationship between the first position information and the second position information can be established in advance. The preset correspondence relationship can be a calculation relationship or a mapping relationship. In detail, the direction and the distance of the preset user relative to the indoor unit can be put into the preset correspondence relationship, and the direction and the distance of the preset user relative to the line control device can be determined by calculation or looking up in a table and taken as the second position information. In addition, the area where the preset user is relative to the line control device can be determined by the first position information, and the preset direction and the preset distance of the area relative to the line control device can be taken as the second position information.

In detail, when the line control device and the indoor unit are installed on the same wall and the first position information includes direction information, the direction information of the first position information can be directly taken as direction information of the second position information. When the first position information includes distance information, the distance information of the first position information can be directly taken as distance information or a threshold value of the distance information of the second position information. In this way, for example, when it is detected that the preset user is located A m in front of the indoor unit, it can be determined that the preset user is located in front of the line control device and the distance between the preset user and the line control device is less than or equal to A m. When the line control device and the indoor unit are installed on two different walls, a preset correspondence relationship between the first position information and the second position information is established based on the relative positions of the two walls, and the obtained first position information is converted into the second position information according to the preset correspondence relationship. In this way, for example, when the line control device and the indoor unit are installed on two opposite walls, and for example when it is detected that the preset user is located A m in front of the indoor unit, and a distance between the two walls is B m, it can be determined that the preset user is located (B-A) m in front of the line control device.

Step S30, determining detection parameters of a voice module in the line control device according to the second position information.

The detection parameters of the voice module refer to related detection parameters involved in the process of the voice module receiving the voice signals and recognizing a voice control instruction in the voice signal. The detection parameters of the voice module includes pickup characteristic parameters and/or voice recognition parameters. Different second position information corresponds to different detection parameters, so that the voice module can detect the voice control instructions sent by the users at different positions.

In detail, different second position information corresponds to different pickup characteristic parameters. The pickup characteristic parameters include a pointing direction, an amplitude, a phase or the like of a sound pickup beam which are used to form the sound pickup beam to recognize the voice control instruction. For example, the direction corresponding to the direction information of the second position information can be taken as the pointing direction of the sound pickup beam. The farther the distance corresponding to the distance information of the second position information is, the smaller the amplitude of the sound pickup beam will be. The larger the direction corresponding to the direction information of the second position information deviates from the straight ahead of the line control device, the larger the minimum threshold value of the phase difference of the sound pickup beam is. When the direction corresponding to the direction information of the second position information is not directly in front of the line control device, the farther the distance corresponding to the distance information of the second position information is, the larger the minimum threshold value of the phase difference of the sound pickup beam will be.

In addition, different second position information corresponds to different voice recognition parameters. The voice recognition parameters include noise reduction coefficients and other parameters for signal processing and instruction extraction of the sound pickup beam. In detail, the farther the distance corresponding to the distance information of the second position information is, the greater the noise reduction coefficient will be. Among them, the larger the noise reduction coefficient is, the smaller the unit frequency band range of recognition when extracting voice signals in the sound pickup beam will be, so as to ensure the effective filtering of environment noises which are not voice signals in the pickup beam.

Step S40, controlling the voice module to detect voice control instructions according to the detection parameters.

The voice module operates according to the detection parameters to detect the voice control instructions of the preset user. In detail, when the detection parameters include the pickup characteristic parameters, the voice module sends out the sound pickup beam according to the pickup characteristic parameters to capture voice signals at the position of the preset user. When the detection parameters include voice recognition parameters, the voice module recognizes the voice signals according to the voice recognition parameters to obtain the voice control instructions in the voice signals.

When the detection parameters include the pickup characteristic parameters and the voice recognition parameters, Step S30 includes determining the pickup characteristic parameters and the voice recognition parameters according to the second position information. Step S40 includes: controlling the voice module to form a sound pickup beam according to the pickup characteristic parameters; extracting voice signals from the sound pickup beam according to the voice recognition parameters; and extracting a voice control instruction from the voice signals. For example, the voice module captures all audio signals in the space where the line control device is located, a sound pickup beam is formed in the audio signals according to the pickup characteristic parameters, so as to obtain the audio signals formed at the position of the preset user, the voice signals are extracted according to the voice recognition parameters in the sound pickup beam, and then the voice control instructions related to the indoor unit (such as, turning on the air conditioner, increasing the temperature, reducing the wind speed or other voice control instructions) are recognized in the voice signals. The pickup characteristic parameters and the voice recognition parameters of the voice module are all changed with the change of the second position information, which can ensure that the voice control instructions of the preset user at different positions can be accurately recognized.

Further, before executing the extracting the voice control instruction in the voice signals, a signal strength threshold can be determined according to the second position information; strength characteristic parameters of the voice signals are extracted; whether the strength characteristic parameter is greater than or equal to the signal strength threshold is determined; if the strength characteristic parameter is greater than or equal to the signal strength threshold, the extracting the voice control instruction in the voice signals is executed; if the strength characteristic parameter is less than the signal strength threshold, a prompt message is sent. Here, different second position information corresponds to different signal strength thresholds, and the closer the preset user is relative to the line control device according to the second position information and/or the closer the preset user to the straight ahead of the line control device, the greater the signal strength threshold will be. This method can ensure that the voice control instruction is recognized only when the strength of the voice signals are sufficiently large, when the strength is insufficient, prompt information is sent to remind the user to send the voice control instruction again, thereby ensuring the accuracy of recognizing the voice control instruction.

In addition, in other embodiments, when the detection parameters include the pickup characteristic parameters, the voice module can be controlled to form a sound pickup beam according to the pickup characteristic parameters, and then the sound pickup beam can be recognized according to other preset recognition parameters to obtain the voice control instruction. When the detection parameters include voice recognition parameters, the directional pickup operation may not be executed. In all the audio signals captured by the voice module, all the captured audio signals are directly processed and recognized according to the determined voice recognition parameters to obtain the voice control instruction.

In this embodiment, the second position information of the preset user relative to the line control device is determined according to the first position information of the preset user relative to the indoor unit, the detection parameters of the voice module in the line control device are determined according to the second position information, and the voice module is controlled to detect the voice control instruction according to the detection parameters. As the installation position of the line control device is closer to the preset user, the voice signals detected by the voice module in the line control device are stronger than the voice signals detected by the indoor unit. Furthermore, the detection parameters of the voice module are different when the second position information is different. Thus, regardless of where the preset user sends out the voice control instruction, it can be accurately recognized by the voice module, thereby improving the accuracy of the air conditioner recognizing voice instruction is improved. Thus, the air conditioner can respond to the voice instruction sent by users in time and effectively.

Further, based on the first embodiment, a second embodiment of the air-conditioning instruction detection method of the present application is proposed. In the second embodiment, referring to FIG. 4, before step S20, the method also includes the following operations.

Figure 4:
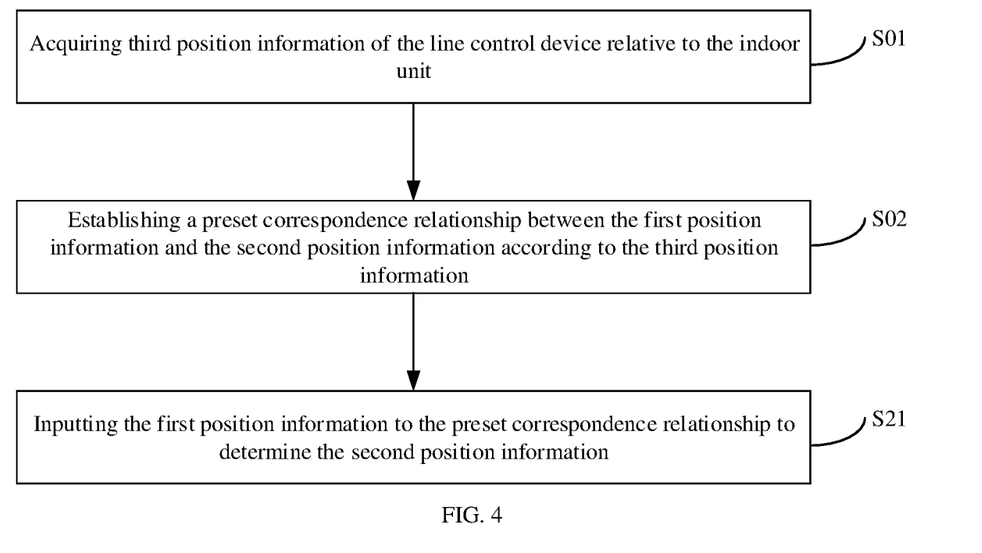
FIG. 4 is a flow diagram of a second embodiment of the air-conditioning instruction detection method of the present application.

Step S01, acquiring third position information of the line control device relative to the indoor unit.

The third position information is obtained by obtaining the parameters set by the user. A heat release component can also be arranged in the line control device, and the infrared detection information of the heat release component is collected by the infrared sensor in the indoor unit, and position information of the heat release component relative to the indoor unit is determined according to the infrared detection information of the heat release component and taken as the third position information.

Step S02, establishing a preset correspondence relationship between the first position information and the second position information according to the third position information.

For example, the preset correspondence relationship can be a calculation relationship, the first position information and the third position information can be represented by coordinates in the same preset spatial coordinate system, the third position information is taken as a constant, and a vector formula with the first position information and the second position information as variables is established.

In addition, the preset correspondence relationship can also be a transformation relationship. A first direction, a second direction and a third direction which are perpendicular to each other with the indoor unit as a reference object can be predefined as first preset directions. A fourth direction, a fifth direction and a sixth direction perpendicular to each other with the line control device as a reference object can be predefined as second preset directions. In the third position information, a distance of the line control device relative to the indoor unit in each first preset direction according to the third position information is taken as a conversion parameter, and conversion characteristics between each first preset direction and each second preset direction together with the conversion parameters can be taken as a conversion relationship between the first position information and the second position information.

Step S20 includes the following operations.

Step S21, inputting the first position information to the preset correspondence relationship to determine the second position information.

When the preset correspondence relationship is a calculation relationship, the first position information can be input into the vector formula as a known quantity to obtain a calculation result which can be taken as the second position information.

When the preset correspondence relationship is a conversion relationship, the first position information indicates the distances of the preset user relative to the indoor unit in the plurality of first preset directions, and the distances of the preset user relative to the line control device in the plurality of second preset directions are obtained according to the conversion relationship and taken as the second position information. For example, the third position information is that the line control device is 2 m below, 1.8 m right and 1.2 m ahead of the indoor unit, according to this, a preset correspondence relationship is established, when the first position information is detected as the preset user at 2.5 m ahead and 1.5 m left of the indoor unit, the second position information can be determined as the preset user being 3.3 m ahead and 1.3 m right of the line control device when the preset user's foot is taken as a point to identifying the preset user's position.

In the above manner, the third position information is introduced into the conversion of determining the second position information based on the first position information, so that the determined second position information is more accurate, and the accuracy of recognizing the voice control instruction is further improved.

Further, based on any of the above-mentioned embodiments, a third embodiment of the air-conditioning instruction detection method of the present application is proposed. In the third embodiment, referring to FIG. 5, Step S10 includes the following operations.

Figure 5:
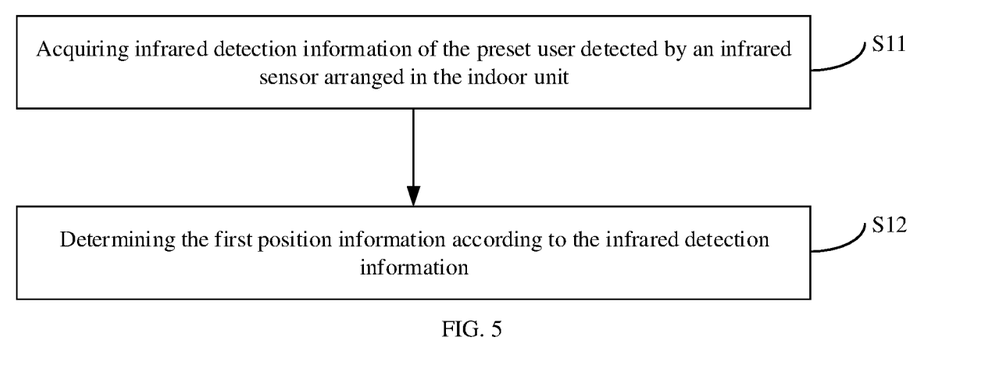
FIG. 5 is a flow diagram of a third embodiment of the air-conditioning instruction detection method of the present application.

Step S11, acquiring infrared detection information of the preset user detected by an infrared sensor arranged in the indoor unit.

Through the infrared sensor arranged in the indoor unit, the infrared detection information of the space where the indoor unit is located is collected, and the infrared detection information of the preset user is extracted from the collected infrared detection information. When there is more than one user in the space where the indoor unit is located, the preset user is determined first, and then the infrared detection information of the preset user is extracted.

Step S12, determining the first position information according to the infrared detection information.

The infrared detection information includes the time difference between the infrared sensor emitting the infrared rays in a plurality of directions and receiving the infrared rays reflected by the preset user. According to the time difference, the direction and/or the distance of the preset user relative to the indoor unit can be determined as the first position information.

Any part of the preset user (the mouth, hands, feet, etc.) can be selected as a feature point to characterize the preset user's position relative to the indoor unit. For example, the infrared detection information can also include heat distribution in the space where the indoor unit is located. Therefore, human bodies can be recognized according to the heat distribution in the infrared detection information, the position of the feature part in the recognized human bodies can be determined, the time difference related to the position of the feature part can be obtained, and the direction and/or the distance of the feature part relative to the indoor unit can be determined according to the obtained time difference as the characteristic information. In detail, in order to further improve the accuracy of recognizing the voice control instruction, and further reduce noise interference other than voice sent by the preset user, the mouth can be taken as the feature point of the preset user's position, and Step S12 includes determining a position of a mouth of the preset user according to the infrared detection information, and obtaining the position information of the mouth's position as the first position information.

In this embodiment, instead of using other sensors outside the indoor unit, the first position information of the preset user relative to the indoor unit is determined by the infrared detection information of the infrared sensor arranged in the indoor unit, thereby obtaining the first position information more intuitively and accurately and ensuring the accuracy of the obtained first position information.

Further, based on any of the above-mentioned embodiments, a fourth embodiment of the air-conditioning instruction detection method of the present application is proposed. In the fourth embodiment, referring to FIG. 6, Step S10 is preceded by the following operations.

Figure 6:
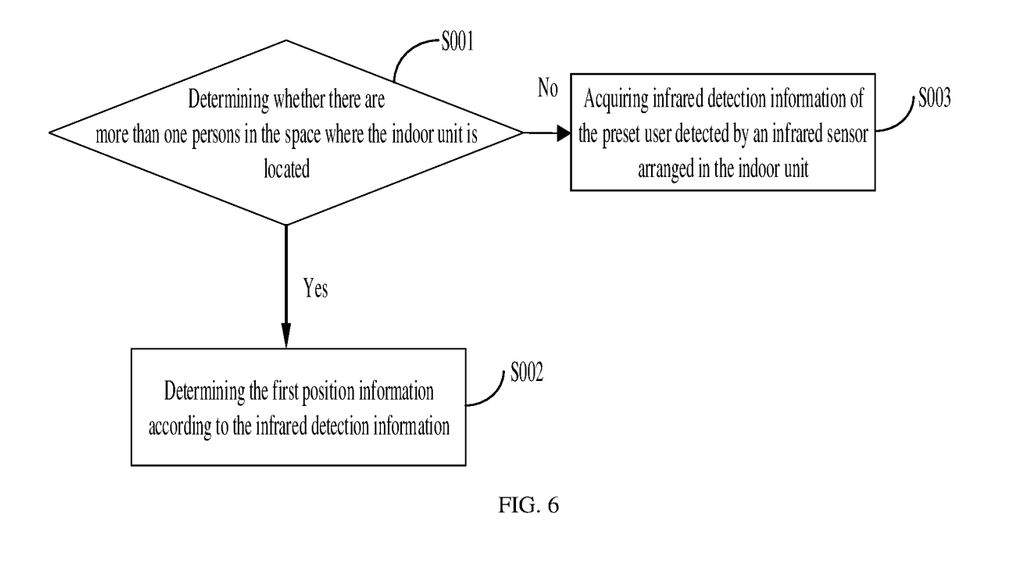
FIG. 6 is a flow diagram of a fourth embodiment of the air-conditioning instruction detection method of the present application.

Step S001, determining whether there are more than one persons in the space where the indoor unit is located;

executing Step S002 if there are more than one persons; executing Step S003 if there is one human being.

For example, the number of persons can be analyzed through the infrared detection information collected by the infrared sensor arranged in the indoor unit.

Step S002, obtaining a duration of each person staying in the space, and taking a user with the shortest duration as the preset user.

At any time before the current time, when it is found that a person enters the space according to the infrared detection information, the person is tracked and the duration of the person in the space is timed. At the current time, the corresponding duration of each current person in the space is obtained, and the user with the shortest duration is taken as the preset user.

Step S003, taking the person as the preset user.

In this embodiment, when there are a plurality of person in the room, as the person newly entering the room are most likely to adjust the operation of the indoor unit, the new person is selected among the plurality of current person as a target user for issuing the voice control instruction, and the voice module of the line control device is controlled to detect the voice control instruction based on the new person's position, so as to ensure that the voice signal having the effective voice control instruction is obtained and the voice control instruction is accurately recognized from the voice signal. Thus, the indoor unit can respond accurately. In addition, the embodiment of the application also provides a readable storage medium, the readable storage medium is stored with an air-conditioning instruction detection program, and when the air-conditioning instruction detection program is executed by a processor, the relevant steps of any embodiment of the above air-conditioning instruction detection method are realized.

It should be noted that in this article, the term "include", "comprise" or any other variant thereof is intended to cover non-exclusive inclusion, so that a process, method, article or system that includes a set of elements includes not only those elements but also other elements that are not explicitly listed, or also elements inherent to such a process, method, article or system. In the absence of more restrictions, an element defined with the statement "include a . . . " does not preclude the existence of another identical element in the process, method, article or system in which the element is included.

The above serial numbers of the embodiments of the present application are for description only and do not represent the superiority and inferior of the embodiments.

From the above description of the embodiments, it will be clear to those skilled in the art that the method of the above embodiments can be implemented by means of software plus the necessary common hardware platform, and of course also by means of hardware, but in many cases the former is preferred. Based on this understanding, the technical solution of the present application may be embodied in the form of a software product which is stored on a storage medium as described above, in essence or in part contributing to the prior art (such as ROM/RAM, Disk, CD-ROM), and includes instructions for causing a terminal device (which can be a mobile phone, a computer, a server, an air-conditioning system, or a network equipment, etc.) to execute the methods described in various embodiments of the present application.

The above are only optional embodiments of the present application, and is not therefore limiting the scope of the present application. Any equivalent structure or equivalent process transformation made by using the contents of the specification and drawings of the present application, or any direct/indirect application in other related technical fields is included in the claimed scope of the present application.

What is claimed is:

1. An air-conditioning instruction detection method comprising:
  acquiring first position information of a preset user relative to an indoor unit;
  determining second position information of the preset user relative to a line control device of the indoor unit according to the first position information;
  determining detection parameters of a voice module in the line control device according to the second position information; and
  controlling the voice module to detect voice control instructions according to the detection parameters.

2. The air-conditioning instruction detection method according to claim 1, wherein:
  before the determining the second position information according to the first position information, the method further comprises:
    acquiring third position information of the line control device relative to the indoor unit, and
    establishing a preset correspondence relationship between the first position information and the second position information according to the third position information; and
  the determining the second position information according to the first position information comprises:
    inputting the first position information to the preset correspondence relationship to determine the second position information.

3. The air-conditioning instruction detection method according to claim 2, wherein the inputting the first position information to the preset correspondence relationship to determine the second position information comprises:
  representing the first position information as first distances of the preset user relative to the indoor unit in a plurality of first preset directions; and
  converting the first distances to second distances relative to the line control device in a plurality of second preset directions based on the preset correspondence relationship, and taking the second distances as the second position information.

4. The air-conditioning instruction detection method according to claim 2, wherein, when the preset correspondence relationship comprises a calculation relationship, the inputting the first position information to the preset correspondence relationship to determine the second position information includes inputting the first position information into a preset formula to obtain a calculation result and taking the calculation result as the second position information.

5. The air-conditioning instruction detection method according to claim 2, wherein the acquiring the first position information of the preset user relative to the indoor unit comprises:
  acquiring infrared detection information of the preset user detected by an infrared sensor arranged in the indoor unit; and
  determining the first position information according to the infrared detection information.

6. The air-conditioning instruction detection method according to claim 5, wherein the infrared detection information comprises a time difference between the infrared sensor emitting infrared rays in a plurality of directions and the infrared sensor receiving infrared rays reflected by the preset user, and the determining the first position information according to the infrared detection information includes:
  determining the first position information according to the time difference.

7. The air-conditioning instruction detection method according to claim 5, wherein:
  the infrared detection information comprises:
    a time difference between the infrared sensor emitting infrared rays in a plurality of directions and the infrared sensor receiving infrared rays reflected by a feature part of the preset user; and
    heat distribution information in a space where the indoor unit is located; and
  the determining the first position information according to the infrared detection information comprises:
    determining a position of the feature part of the preset user according to a recognition result of recognizing human bodies in the heat distribution information;
    acquiring the time difference corresponding to the position of the feature part; and determining a direction and/or a distance of the feature part relative to the indoor unit according to the acquired time difference as the first position information.

8. The air-conditioning instruction detection method according to claim 5, wherein the determining the first position information according to the infrared detection information comprises:
determining a position of a mouth of the preset user according to the infrared detection information; and
acquiring position information of the position of the mouth as the first position information.

9. The air-conditioning instruction detection method according to claim 1, wherein:
the determining detection parameters of the voice module in the line control device according to the second position information comprises determining pickup characteristic parameters and voice recognition parameters according to the second position information; and
the controlling the voice module to detect the voice control instructions according to the detection parameters comprises:
controlling the voice module to form a sound pickup beam according to the pickup characteristic parameters;
extracting a voice signal from the sound pickup beam according to the voice recognition parameters; and
extracting a voice control instruction from the voice signal.

10. The air-conditioning instruction detection method according to claim 9, wherein the extracting the voice control instruction from the voice signal comprises:
determining a signal strength threshold according to the second position information;
extracting a strength characteristic parameter of the voice signal;
extracting the voice control instruction from the voice signal in response to a determination that the strength characteristic parameter is greater than or equal to the signal strength threshold; and
sending a prompt message in response to a determination that the strength characteristic parameter is less than the signal strength threshold.

11. The air-conditioning instruction detection method according to claim 10, wherein, the closer the preset user is relative to the line control device, and/or the closer the preset user is directly in front of the line control device according to the second position information, the greater the signal strength threshold is.

12. The air-conditioning instruction detection method according to claim 1, wherein, before the obtaining the first position information of the preset user relative to the indoor unit, the method further comprises:
determining that there are a plurality of users in a space where the indoor unit is located, and obtaining a duration of each user staying in the space; and taking a user with a shortest duration as the preset user; or
determining that there is only one user in a space where the indoor unit is located, and taking the only one user as the preset user.

13. The air-conditioning instruction detection method according to claim 1, wherein the acquiring the first position information of the preset user relative to the indoor unit comprises:
acquiring the first position information with a position detection device provided in the indoor unit.

14. The air-conditioning instruction detection method according to claim 1, wherein the determining second position information according to the first position information comprises:
determining direction information and/or distance information of the preset user relative to the line control device according to the first position information, and taking at least one of the direction information and the distance information as the second position information.

15. The air-conditioning instruction detection method according to claim 14, wherein the determining the detection parameters of the voice module in the line control device according to the second position information comprises:
determining a pickup characteristic parameter according to the at least one of the direction information and the distance information.

16. The air-conditioning instruction detection method according to claim 15, wherein the determining the pickup characteristic parameter according to the at least one of direction information and the distance information comprises:
determining one of a pointing direction, an amplitude, and a phase of the sound pickup beam according to the at least one of the direction information and the distance information, and
taking the determined one of the pointing direction, the amplitude, and the phase of the sound pickup beam as the pickup characteristic parameter.

17. The air-conditioning instruction detection method according to claim 14, wherein:
the determining the direction information and/or the distance information of the preset user relative to the line control device according to the first position information comprises determining the distance information; and
the determining the detection parameters of the voice module in the line control device according to the second position information comprises determining a voice recognition parameter according to the distance information.

18. The air-conditioning instruction detection method according to claim 17, wherein the determining the voice recognition parameter according to the distance information comprises:
determining a noise reduction coefficient for voice signal processing according to the distance information, and taking the noise reduction coefficient as the voice recognition parameter.

19. A control device comprising a memory, a processor, and an air-conditioning instruction detection program stored in the memory and executable the processor, wherein when executed by the processor, the air-conditioning instruction detection program implements an air-conditioning instruction detection method comprising:
acquiring first position information of a preset user relative to an indoor unit;
determining second position information of the preset user relative to a line control device of the indoor unit according to the first position information;
determining detection parameters of a voice module in the line control device according to the second position information; and
controlling the voice module to detect voice control instructions according to the detection parameters.

20. An air-conditioning system comprising:
- a plurality of indoor units distributed in different spaces, wherein each of the plurality of indoor units is provided with an infrared sensor configured to detect infrared detection information of a space where the indoor unit is located;
- a plurality of line control devices arranged in one-to-one correspondence with the plurality of indoor units, wherein an indoor unit and a corresponding line control device are located in a same space, each of the plurality of line control devices comprises a voice module and a controller, the voice module is configured to detect a voice control instruction, the controller is in communication with a corresponding indoor unit and configured to obtain parameters set by a user and control the operation of the corresponding indoor unit according to the parameters set by the user; and
- a control device in communication with the plurality of indoor units and voice modules, the control device comprising a memory, a processor and an air-conditioning instruction detection program stored in the memory and executable by the processor, wherein when executed by the processor, air-conditioning instruction detection program implements an air-conditioning instruction detection method comprising:
- acquiring first position information of a preset user relative to an indoor unit;
- determining second position information of the preset user relative to a line control device of the indoor unit according to the first position information;
- determining detection parameters of a voice module in the line control device according to the second position information; and
- controlling the voice module to detect voice control instructions according to the detection parameters.

* * * * *